March 30, 1926.
J. W. HOLSINGER
1,578,827
CHERRY SEEDER AND STRAWBERRY STEMMER
Filed Sept. 2, 1924
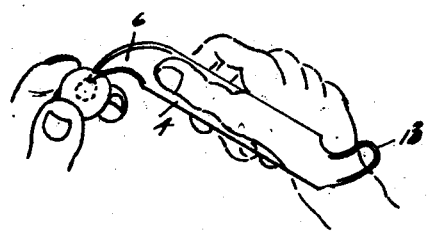
Fig. 5.
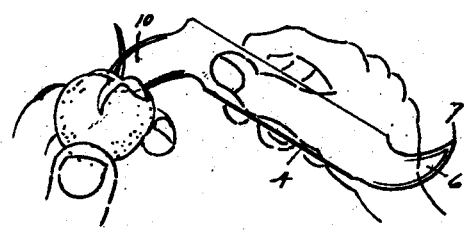
Fig. 6.
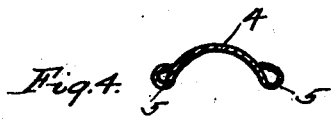
Fig. 4.
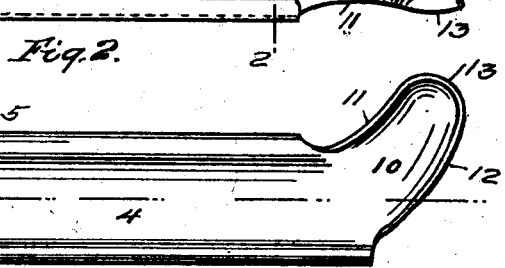
Fig. 2.
Fig. 1.
Fig. 3.
J. W. Holsinger, Inventor
H. M. Plaisted
By Attorney Patented Mar. 30, 1926.

1,578,827

UNITED STATES PATENT OFFICE.

JACOB W. HOLSINGER, OF GRANITE CITY, ILLINOIS.

CHERRY SEEDER AND STRAWBERRY STEMMER.

Application filed September 2, 1924. Serial No. 735,386.

*To all whom it may concern:*

Be it known that I, JACOB W. HOLSINGER, a citizen of the United States, residing at Granite City, in the county of Madison and State of Illinois, have invented certain new and useful Improvements in Cherry Seeders and Strawberry Stemmers, of which the following is a specification.

This invention relates to certain new and useful improvements in cherry seeders and strawberry stemmers the peculiarities of which will be hereinafter fully described and claimed.

The object of my invention is to provide a device that will readily fit the palm of the hand and avoid interference with the hand of the operative ends,—one of which is sharp pointed and the other is sharp but rounded in outline, and both are turned in opposite directions so as to allow a circular motion in removing the seeds from cherries and the stems from strawberries.

In the accompanying drawing on which like reference numerals indicate corresponding parts, Fig. 1 represents a top view of my device; Fig. 2 an edge view of the same; Fig. 3, a section of the sharp pointed concave projection on 3—3 of Fig. 1; Fig. 4 a transverse section on the line 2—2 of Fig. 2; Fig. 5, a view illustrating the use of the device as a cherry seeder; and Fig. 6 a view indicating its use as a strawberry stemmer.

The numeral 4 indicates the body which is hollowed above and convex below so that the thumb of the user can fit in the same as indicated in Figs. 5 and 6. Along the side edge the body is rolled up to make a bead 5 and reinforce or stiffen the thin sheet metal which is preferably used in making the device by stamping it out. At each end is a projection extending in opposite directions in the plane of the body,—one projection 6 having an outline that is concave at one side 7 and convex at the other side 8 and meeting in a sharp point 9 that extends beyond the side of the body and has a cross section shown in Fig. 3 similar to a parabola,—that is the curve near the convex side 8 is on a smaller radius than on the concave side 7.

The object is that when the sharp point 9 is inserted in a cherry with a circular side motion of the hand, the cherry seed is readily scooped out with little cutting of the cherry itself and follows down the concave projection towards the thumb so that in use several seeds are collected near the thumb in the rapid operation of the device. The side edges 7 and 8 are sharpened as shown. The other end of the device has a projection 10 extending in the opposite direction from the sharp pointed projection 6. This projection 10 also lies in the plane of the body and is concave and the outline has similar concave and convex outline edges 11 and 12 respectively, but terminate in a rounded end 13. All of these edges are sharpened as shown so that when the projection 10 is used upon the stem of a strawberry or similar fruit as indicated in Fig. 6, the stem is readily removed from the berry without crushing the latter.

While I have explained its use in connection with a cherry and a strawberry it is evident the device may be used with other fruit of similar character to which it may be found adapted.

I claim,

1. In a device of the character described, a thin semi-cylindrical body having reinforced sides and a sharp pointed concave projection at one end curved to one side and lying substantially in the plane of the body and having sharp side edges of convex and concave outline meeting in said point,—the cross section of said projections being parabolic with the focus nearer the convex side edge, substantially as and for the purpose described.

2. In a device of the character described, a body adapted to fit the hand of the user and having a sharp-edged concave projection with the edges formed respectively on a concave and a convex outline that curve the projection to one side and form a sharp point, substantially as described.

In testimony whereof I have affixed my signature.

JACOB W. HOLSINGER.